(12) United States Patent
Vincent et al.

(10) Patent No.: US 9,972,851 B2
(45) Date of Patent: May 15, 2018

(54) METHOD FOR MANUFACTURING A MEMBRANE/ELECTRODE ASSEMBLY COMPRISING REINFORCEMENTS

(71) Applicant: COMMISSARIAT A L'ENERGIE ATOMIQUE ET AUX ENERGIES ALTERNATIVES, Paris (FR)

(72) Inventors: Remi Vincent, Grenoble (FR); Julien Tard, Saint-Quentin-Fallavier (FR); Denis Tremblay, Pommiers-la-Placette (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 199 days.

(21) Appl. No.: 15/038,886

(22) PCT Filed: Dec. 1, 2014

(86) PCT No.: PCT/FR2014/053090
§ 371 (c)(1),
(2) Date: May 24, 2016

(87) PCT Pub. No.: WO2015/079189
PCT Pub. Date: Jun. 4, 2015

(65) Prior Publication Data
US 2016/0380278 A1    Dec. 29, 2016

(30) Foreign Application Priority Data
Nov. 29, 2013 (FR) ...................................... 13 61815

(51) Int. Cl.
*H01M 8/02* (2016.01)
*H01M 8/0273* (2016.01)
(Continued)

(52) U.S. Cl.
CPC ....... *H01M 8/0273* (2013.01); *H01M 8/0286* (2013.01); *H01M 8/1004* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 4,945,203 A | * | 7/1990 | Soodak | ............... B29C 65/7473 156/251 |
| 8,182,958 B2 | * | 5/2012 | Okanishi | ............. H01M 8/0273 429/480 |

(Continued)

OTHER PUBLICATIONS

International Search Report dated Mar. 5, 2015 for PCT/FR2014/053090 filed on Dec. 1, 2014.

*Primary Examiner* — Scott J Chmielecki
(74) *Attorney, Agent, or Firm* — Oblon, McClelland, Maier & Neustadt, L.L.P.

(57) ABSTRACT

The invention relates to a method for manufacturing a membrane/electrode assembly, including the steps of: providing a proton exchange membrane comprising a first electrode and a second electrode; placing a first reinforcement with an overlapping portion vertically adjacent to the periphery of the membrane, and with an extension portion made of a polymer material extending laterally beyond the membrane; placing a second reinforcement with an overlapping portion that is vertically adjacent to the periphery of the membrane, and with an extension portion of said second reinforcement extending laterally beyond the membrane and being vertically adjacent to the extension portion of the first reinforcement; applying a laser beam to the vertically adjacent extension portions such as to define an opening through the extension portions and such as to weld the extension portions.

11 Claims, 2 Drawing Sheets

(51) Int. Cl.
H01M 8/0286 (2016.01)
H01M 8/1004 (2016.01)

(56) References Cited

U.S. PATENT DOCUMENTS

| | | | |
|---|---|---|---|
| 8,192,895 B2* | 6/2012 | Muta | H01M 8/1004 |
| | | | 429/469 |
| 2005/0208361 A1 | 9/2005 | Enjoji et al. | |
| 2007/0054169 A1* | 3/2007 | Day | H01M 4/9033 |
| | | | 429/482 |
| 2008/0105354 A1 | 5/2008 | James et al. | |
| 2008/0105540 A1* | 5/2008 | Federico | C25B 9/203 |
| | | | 204/257 |
| 2008/0107948 A1* | 5/2008 | Yamanis | H01M 8/021 |
| | | | 429/457 |
| 2009/0081493 A1* | 3/2009 | Schrooten | H01M 8/0297 |
| | | | 429/509 |
| 2009/0098432 A1* | 4/2009 | Rosenberg | F28F 13/12 |
| | | | 429/444 |
| 2009/0162734 A1 | 6/2009 | Yandrasits et al. | |
| 2010/0055531 A1* | 3/2010 | Ohmori | H01M 4/8882 |
| | | | 429/434 |
| 2010/0068588 A1* | 3/2010 | Nogi | H01M 8/0271 |
| | | | 429/513 |
| 2010/0112196 A1* | 5/2010 | Prinz | C25B 9/10 |
| | | | 427/115 |
| 2011/0177423 A1 | 7/2011 | Nachtmann et al. | |
| 2013/0216932 A1 | 8/2013 | Yandrasits et al. | |
| 2013/0280634 A1* | 10/2013 | Park | H01M 8/1226 |
| | | | 429/458 |
| 2015/0333352 A1* | 11/2015 | Kikuzumi | H01M 8/1004 |
| | | | 429/463 |

* cited by examiner

METHOD FOR MANUFACTURING A MEMBRANE/ELECTRODE ASSEMBLY COMPRISING REINFORCEMENTS

The invention relates to the proton exchange membranes (PEMs) that are used, for example, in fuel cell stacks or electrolyzers.

A fuel cell stack is an electrochemical device that converts chemical energy directly into electrical energy. Dihydrogen is used as the fuel for the fuel cell stack. The dihydrogen is oxidized and ionized on one electrode of the stack and dioxygen from the air is reduced on another electrode of the stack. The chemical reaction produces water at the cathode, as a result of the oxygen being reduced and reacting with the protons. The chief advantage of the fuel cell stack is that it avoids the release of atmospherically polluting compounds at the place of electricity generation.

Proton exchange membrane, or PEM, fuel cell stacks have compactness properties that are particularly noteworthy. Each cell comprises an electrolytic membrane that allows only protons to pass through and excludes electrons. The membrane comprises an anode on a first side and a cathode on a second side in order to form a membrane/electrode assembly, or MEA.

At the anode, the dihydrogen is ionized in order to produce protons that cross the membrane. The electrons produced by this reaction migrate toward a flow plate, then flow through an electrical circuit that is external to the cell to form an electric current.

The fuel cell stack may comprise multiple cells, separated by plates called bipolar plates. The MEA is positioned between two bipolar plates. The bipolar plates may comprise channels and orifices for guiding the reactants and products toward/away from the MEA. The plates are also electrically conductive so as to form collectors to collect the electrons produced at the anode.

The methods for assembling the fuel cell stack, and in particular the methods for manufacturing the MEA, are of crucial importance to the performance of the fuel cell stack and its service life.

The document US2008/0105354 describes such a method for assembling a membrane/electrode assembly for a fuel cell stack. The membrane/electrode assembly formed comprises reinforcements. Each reinforcement surrounds the electrodes. The reinforcements are formed on the basis of polymer films and reinforce the membrane/electrode assembly, for example at the level of the gas and cooling liquid inlets. The reinforcements have flow channels for the various fluids that are placed facing the flow channels of the flow plates. The reinforcements facilitate the handling of the membrane/electrode assembly to avoid it getting damaged. The reinforcements also limit the temperature- and humidity-dependent variations in the dimensions of the membrane. In practice, the reinforcements are superposed over the periphery of the electrodes, in order to limit the gas permeation phenomenon that causes the membrane/electrode assembly to deteriorate.

According to this method, a first reinforcement is produced by forming an opening beforehand in the median part of a polymer film. The first reinforcement comprises an adhesive that is sensitive to pressure on one side. A membrane/electrode assembly is recovered and the opening of the first reinforcement is placed therein, plumb with a first electrode. The first reinforcement covers the periphery of this first electrode.

A second reinforcement, identical to the first, is applied. The opening of this second reinforcement is placed plumb with the second electrode. This second reinforcement covers the periphery of the second electrode. The edge of the membrane is thereby sandwiched between two polymer films. Each of the polymer films comprises pressure-sensitive adhesive. The adhesive of each film is placed in contact with the adhesive of the other film, with one side of the edge of the membrane, and with the edge of an electrode.

Hot pressing is subsequently carried out so that the adhesive:
fixes the reinforcements to the membrane and to the edge of the electrodes;
fixes the reinforcements to one another.

Flow channels are subsequently made at the periphery of the reinforcements in order to allow fluids to flow.

First and second gas diffusion layers are subsequently placed in contact with the first and second electrodes, respectively.

For multiple reasons, the edge of the membrane does not extend up to the edge of the outer reinforcements. Specifically, a membrane with a smaller surface area may thus be used in order to reduce its cost without affecting its efficacy. Furthermore, the risk of contaminating the active area of the membrane with cooling liquid through capillary effect from the openings made in the reinforcement is limited. The cooling liquid is frequently a mixture of water and glycol.

The adhesive of the reinforcement films then serves not only to ensure the fixation of these films, but also to ensure tightness between the cooling liquid flow channels and the edge of the membrane, and to ensure tightness with respect to gas crossing the gas diffusion layers.

Such a method has multiple drawbacks, both for a fuel cell stack and an electrolyzer. The choice of adhesive is critical. Furthermore, the manufacturing method is relatively complex and necessitates numerous steps, and is liable to lead to the rejection of the membrane/electrode assembly.

Moreover, for a fuel cell stack, the gas diffusion layers may be positioned badly with respect to the openings of the reinforcements. A gas diffusion layer may potentially overlap a joint of a flow channel, thereby leading to leakages. In order to overcome this problem, the distance between the flow channels and the gas diffusion layers is frequently increased, to the detriment of the volume power density of the fuel cell stack.

There is therefore a need for a method for manufacturing a membrane/electrode assembly equipped with reinforcements that provides a solution to one or more of these drawbacks. The invention thus pertains to a method for manufacturing a membrane/electrode assembly such as defined in the appended claims.

Other features and advantages of the invention will become more clearly apparent from the description thereof that is given below, by way of wholly non-limiting indication, and with reference to the appended drawings, in which.

The invention will subsequently be described in detail in an example of a method for manufacturing a membrane/electrode assembly of a construction intended, in particular, for a fuel cell stack. Of course, the invention is also applicable to a method for manufacturing a membrane/electrode assembly intended for other applications, in an electrolyzer for example.

Figure 1:
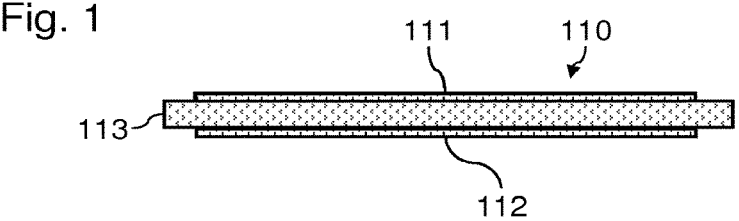
FIGS. 1 to 6 illustrate various steps of an example of a method for manufacturing a membrane/electrode assembly according to the invention, in the particular case of application to a fuel cell stack.

In FIG. 1, a membrane/electrode assembly 110 is provided. The membrane/electrode assembly 110 comprises, in a manner known per se:

- a proton exchange membrane 113 or a polymer electrolyte membrane;
- a first electrode 111 (the anode for example) that is positioned on a first side of the electrolyte 113;
- a second electrode 112 (the cathode for example) that is positioned on a second side of the electrolyte 113.

The membrane 113 forms a semi-permeable membrane that allows protons to be conducted while being impermeable to the gases present in the cell. The membrane 113 also prevents the electrons from passing between the electrodes 111 and 112.

In this example, the periphery of the membrane 113 extends beyond the electrodes 111 and 112. In this example, the electrodes 111 and 112 are fixed to the membrane 113 beforehand, by means of one or more hot pressing steps, for example.

Figure 2:
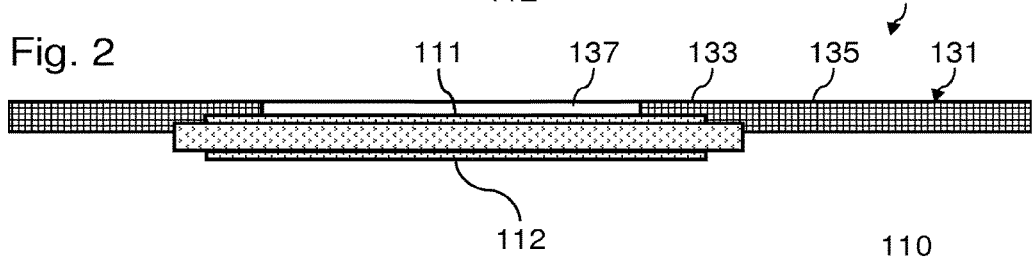

In FIG. 2, a first reinforcement 131 is applied. The reinforcement 131 comprises an overlapping part 133 and an extension part 135. A median opening 137 is here made in the overlapping part 133. The reinforcement 131 is positioned so that the overlapping part 133 is superposed over the periphery of the membrane 113 and so that the extension part 135 extends laterally beyond the proton exchange membrane 113. The reinforcement 131 is here also positioned so that the electrode 111 is accessible through the median opening 137.

In this example, the reinforcement 131 is in contact with both the membrane 113 and the electrode 111. Provision may also be made for the overlapping part 133 to be in contact solely with the membrane 113 or with the electrode 111.

Figure 3:
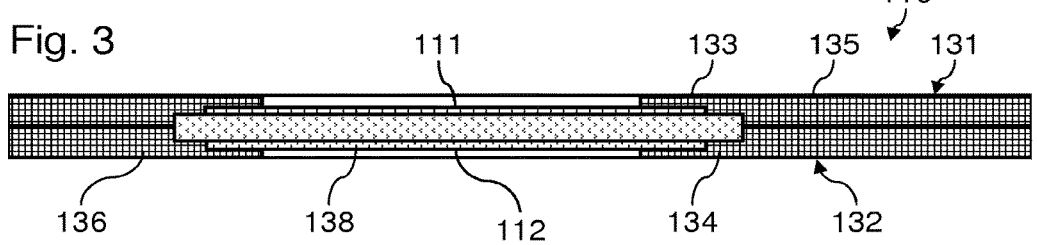

In FIG. 3, a second reinforcement 132 is applied. The reinforcement 132 comprises an overlapping part 134 and an extension part 136. An opening 138 is here made in the overlapping part 134. The reinforcement 132 is positioned so that the overlapping part 134 is superposed over the periphery of the membrane and so that the extension part 136 extends laterally beyond the proton exchange membrane 113. The reinforcement 132 is here also positioned so that the electrode 112 is accessible through the median opening 138. Furthermore, the extension part 136 is superposed over the extension part 135 of the reinforcement 131.

In this example, the reinforcement 132 is in contact with both the membrane and the electrode 112. Provision may also be made for the overlapping part 134 to be in contact solely with the membrane or with the electrode 112.

Figure 4:
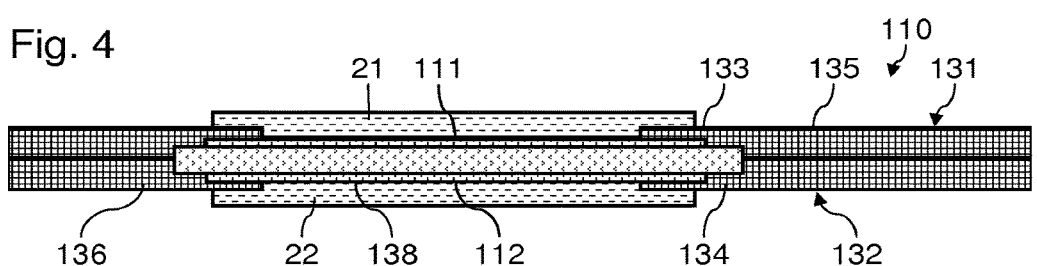

In this method for manufacturing the membrane/electrode assembly 110 intended for a fuel cell stack, a gas diffusion layer 21 (and potentially a gas diffusion layer 22 that is in contact with the electrode 112 through the median opening 138) that is in contact with the electrode 111 through the median opening 137 may also advantageously be applied, as illustrated in FIG. 4. The gas diffusion layer 21 may be fixed to the electrode 111, by a hot pressing step, for example. In the case of such hot pressing, the overlapping parts 133 and 135 may advantageously be fixed to the membrane 113 and/or to the electrodes 111, 112, respectively.

Advantageously, the position of the edge of the gas diffusion layer 21 with respect to the reinforcements 131 is determined. The position of one or more corners of the gas diffusion layer 21 may, for example, be determined by means of a camera. A position measurement by a camera typically allows a measurement precision of the order of 100 pm to be obtained. A position with respect to the determined position of the gas diffusion layer 21, in which one or more openings must be made through the extension parts of the reinforcements 131 and 132, is subsequently determined by calculation. The position of one or more openings may, for example, be defined using a given offset with respect to the edge of the gas diffusion layer 21. Advantageously, the position with respect to the determined position of the gas diffusion layer 21, in which a peripheral contour of the reinforcements 131 and 132 must be made, is also determined. Advantageously, the position of the gas diffusion layers 21 and 22 may be taken into account in order to determine the position of the openings and/or of the peripheral contour.

Thus, the position of the openings and of the peripheral contour of the reinforcements 131 and 132 may be adjusted so that the gas diffusion layers do not overlap joints that are placed in contact with the reinforcements 131 and 132, even in the event of dispersions in the positions of the gas diffusion layers 21 and 22. Such positioning allows the distance between an opening and a gas diffusion layer to be kept down during the design phase. The volume power density of the membrane/electrode assembly is thereby increased.

Figure 5:
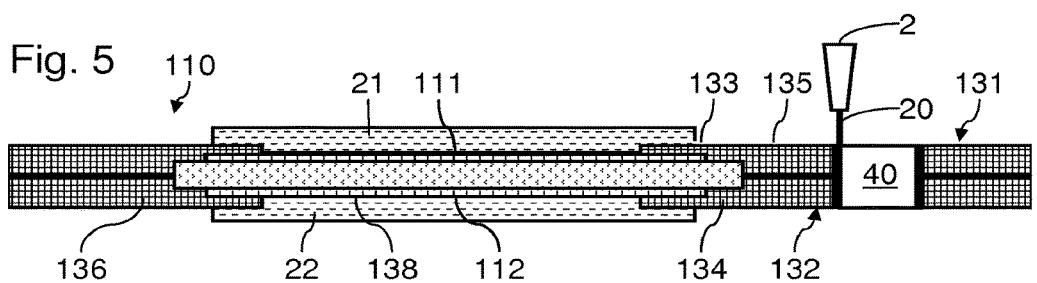

In the step illustrated in FIG. 5, the extension parts 135 and 136 are still independent. The extension parts 135 and 136 are maintained in contact by any appropriate means, for example by pneumatic actuators. The extension parts 135 and 136 that are maintained in contact are advantageously without adhesive. A laser beam 20 is applied by a cutting head 2 to the superposition of the extension parts 135 and 136. The laser beam 20 simultaneously:

- cuts an opening 40 through the superposition of the extension parts 135 and 136; and
- welds the extension parts 135 and 136 at the edge of the opening 40.

If appropriate, the opening 40 is cut at a position that is determined with respect to the position of the edge of the gas diffusion layer 21 and/or 22. One or more openings 40 may be defined, for example, for a flow of cooling liquid, for a flow of a gaseous reactant (or of a liquid to be electrolyzed for an electrolyzer), or for the passage of elements for centering with respect to a stack of membrane/electrode assemblies.

Such a method allows the number of steps in the manufacturing method for the purpose of fixing the reinforcements 131 and 132 and obtaining tightness at the edge of the opening 40 to be significantly reduced.

Moreover, this method allows the use of an adhesive to fix the reinforcements 131 and 132 to one another and to ensure tightness at the edge of the openings 40 to be dispensed with. The absence of adhesive allows the cost of manufacturing the membrane/electrode assembly 110 to be reduced and also allows the application of solvents for an adhesive to the reinforcements 131 and 132 to be avoided. Additionally, in contrast to the case in which an adhesive is used, making the openings 40 according to such a method does not weaken the fixation between the reinforcements 131 and 132, and fixing the reinforcements does not alter the geometry of the openings 40 with a potential overflow of adhesive. Furthermore, it may be noted that the greater the number of openings 40, the greater the mechanical strength of the bond between the reinforcements 131 and 132.

Figure 6:
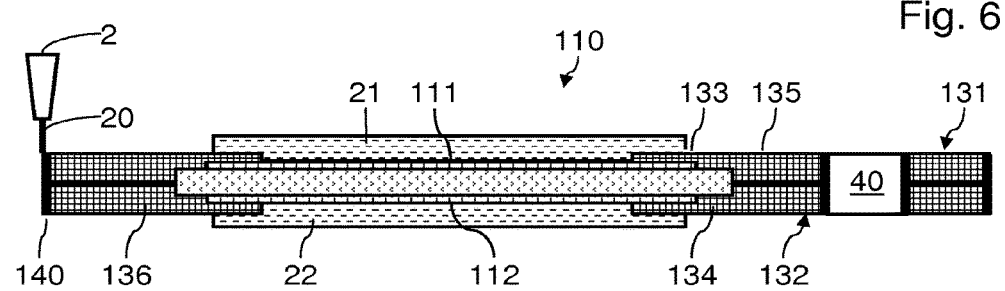

In the step illustrated in FIG. 6, the extension parts 135 and 136 are still maintained in contact. The laser beam 20 is applied by the cutting head 2 to the superposition of the extension parts 135 and 136. The laser beam 20 simultaneously:

cuts a peripheral contour 140 through the superposition of the extension parts 135 and 136; and welds the extension parts 135 and 136 at the edge of the peripheral contour 140.

Thus, tightness is obtained around the entire peripheral contour 140 of the reinforcements 131 and 132 during the step of cutting this peripheral contour 140.

If appropriate, the peripheral contour 140 is cut at a position that is determined with respect to the position of the edge of the gas diffusion layer 21 and/or 22.

Figure 7:
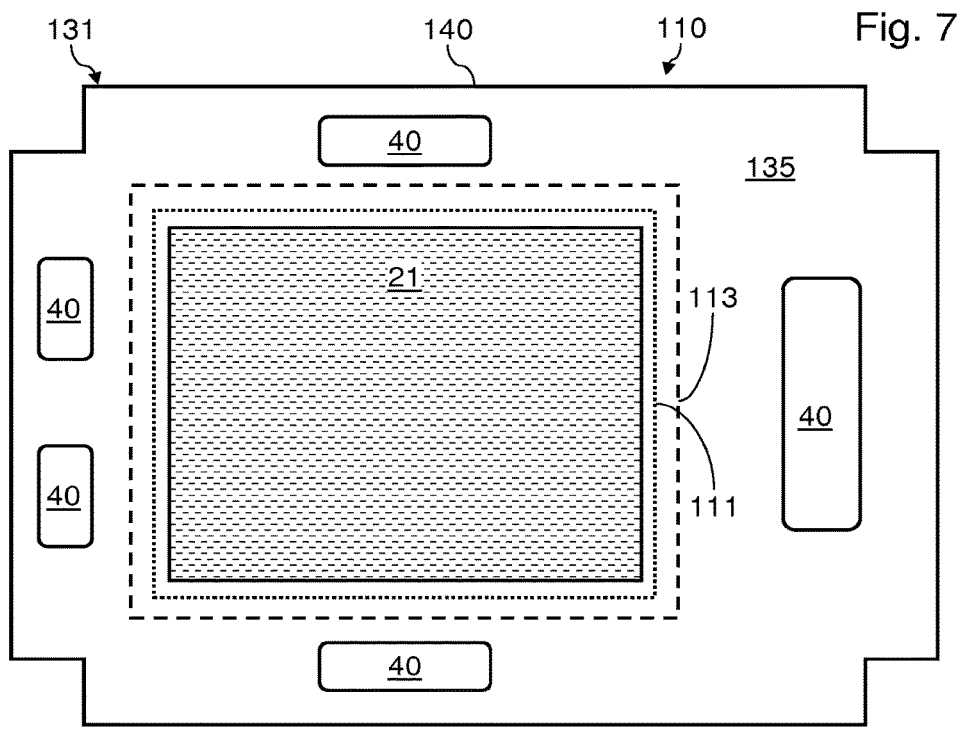
FIG. 7 is a plan view of a membrane/electrode assembly resulting from these steps.

FIG. 7 is a top view of an example of a membrane/electrode assembly 110 resulting from cutting the peripheral contour 140.

In the example, the peripheral contour 140 is made subsequent to the opening 40. It is however also possible to envisage making the peripheral contour 140 before making one or more openings 40.

The reinforcements 131 and 132 reinforce the membrane/electrode assembly, in particular at the level of the gas and cooling liquid inlets that are embodied by openings 40. The reinforcements 131 and 132 also facilitate the handling of the membrane/electrode assembly 110 during the assembly of a fuel cell stack. The reinforcements 131 and 132 also limit the temperature- and humidity-dependent variations in the dimensions of the membrane 113.

The welded extension parts 135 and 136 limit the gas permeation phenomenon that causes the membrane/electrode assembly to deteriorate. Specifically, the openings 40 are made in the extension parts 135 and 136 and not through the membrane 113.

The extension parts 135 and 136 are made of a polymer material in order to allow cutting and welding by the laser beam 20. Advantageously, the polymer materials are chosen from among PET, PTFE, FEP, ETFE, PVF (the trade name of which is Tedlar). The reinforcement 131 and/or the reinforcement 132 may of course be made in one piece of one and the same material.

The reinforcements 131 and 132 used advantageously have the following properties:

a thickness of between 20 and 100 μm, preferably of between 40 and 60 μm, and preferably of 50 μm. Tests have shown that such thicknesses are particularly favorable for cutting and welding by the laser beam 20;

a roughness that is less than 3 μm, preferably less than 1 μm. Tests have shown that such a roughness was favorable for welding at the edge of the produced openings 40.

A laser beam with a power of between 50 and 150 W, and preferably equal to 100 W, is found to be particularly advantageous for implementing the steps of cutting/welding at the edge of the openings 40 and/or of the peripheral contour 140. The lens for focusing the laser beam 20 is advantageously placed at a distance of between 6 and 8 mm from the superposition of the extension parts 135 and 136, while keeping one and the same focal length of the beam, so that the cutting area of the beam is increased. The focal length of the beam may, for example, be between 4 and 6 mm.

Such a distance between the focusing lens and the superposition of the extension parts 135 and 136 is greater than the distance that is normally used for cutting a polymer film, which is usually equal to the focal length of the laser beam 20. 20 Advantageously, the focal point of the laser beam 20 is positioned between 1 and 3 mm above the superposition of the extension parts 135 and 136. The following inequation may also be used: $1.2*Df<Dl<1.5*Df$, where $Df$ is the focal length of the laser beam 20 and $Dl$ is the distance between the focusing lens and the superposition. Such parameters favor the welding of the extension parts 135 and 136 at the cutting edge.

The invention claimed is:

1. A method for manufacturing a membrane/electrode assembly, comprising:

the provision of a proton exchange membrane comprising a first electrode on a first side and a second electrode on a second side;

the placement of a first reinforcement so that an overlapping part of this first reinforcement is superposed over the periphery of the proton exchange membrane, and so that an extension part of the first reinforcement made of a polymer material extends laterally beyond the proton exchange membrane;

the placement of a second reinforcement so that an overlapping part of this second reinforcement is superposed over the periphery of the proton exchange membrane, and so that an extension part of this second reinforcement extends laterally beyond the proton exchange membrane and is superposed over the extension part of the first reinforcement;

the maintenance of contact between the extension parts of the first and second non-fixed reinforcements, and the application of a laser beam to the superposition of the extension parts in such a way as to define an opening through the extension parts and in such a way as to weld the extension parts at the edge of this opening.

2. The manufacturing method as claimed in claim 1, in which the extension parts that are maintained in contact are without adhesive.

3. The method as claimed in claim 1, in which said polymer materials are chosen from among PET, PTFE, FEP, ETFE, PVF.

4. The manufacturing method as claimed in claim 1, in which the sides of the extension parts that are maintained in contact have a roughness that is less than 1 μm.

5. The manufacturing method as claimed in claim 1, in which said reinforcements have a thickness that is between 25 and 100 μm, preferably between 40 and 60 μm.

6. The manufacturing method as claimed in claim 1, in which the power of the applied laser beam is between 50 and 150 W.

7. The manufacturing method as claimed in claim 1, in which the focal length of the applied laser beam is between 4 and 6 mm.

8. The manufacturing method as claimed in claim 7, in which the focal point of the applied laser beam is positioned between 1 and 3 mm above the superposition of the extension parts of the reinforcements.

9. The manufacturing method as claimed in claim 1, additionally comprising the following steps:

the placement of a gas diffusion layer in contact with the first electrode through a median opening of the overlapping part of the first reinforcement;

the determination of the position of an edge of the gas diffusion layer with respect to the first reinforcement;

the determination of a cutting position of an opening depending on the position that is determined for the edge of the gas diffusion layer;

said application of the laser beam being implemented in order to produce said opening at the determined cutting position.

10. The manufacturing method as claimed in claim 9, in which the determination of the position of the edge is preceded by a step of fixing the gas diffusion layer to said first electrode.

11. The manufacturing method as claimed in claim 1, additionally comprising a step of applying a laser beam to the superposition of the extension parts in such a way as to cut a peripheral contour through the extension parts and in such a way as to weld the extension parts at the edge of this peripheral contour.

\* \* \* \* \*